(12) United States Patent
Akiyama et al.

(10) Patent No.: US 7,257,393 B2
(45) Date of Patent: Aug. 14, 2007

(54) METHOD AND APPARATUS FOR TIME CALIBRATION

(75) Inventors: Ryota Akiyama, Kawasaki (JP); Takeaki Kawashima, Tokorozawa (JP)

(73) Assignees: Fujitsu Limited, Kawasaki (JP); Citizen Holdings Co., Ltd., Tokyo (JP)

( * ) Notice: Subject to any disclaimer, the term of this patent is extended or adjusted under 35 U.S.C. 154(b) by 64 days.

(21) Appl. No.: 11/176,895

(22) Filed: Jul. 7, 2005

(65) Prior Publication Data

US 2006/0194573 A1 Aug. 31, 2006

(30) Foreign Application Priority Data

Feb. 28, 2005 (JP) .............................. 2005-053592

(51) Int. Cl.
*H04L 29/00* (2006.01)
*H04Q 7/22* (2006.01)
*H04Q 7/38* (2006.01)

(52) U.S. Cl. ................ 455/414.3; 455/414.1; 455/435.1; 455/456.2; 342/357.06; 342/357.09

(58) Field of Classification Search ............ None
See application file for complete search history.

(56) References Cited

U.S. PATENT DOCUMENTS

| | | | |
|---|---|---|---|
| 6,104,729 A * | 8/2000 | Hellum et al. ............. 370/503 |
| 6,295,023 B1 * | 9/2001 | Bloebaum ............. 342/357.06 |
| 6,530,023 B1 * | 3/2003 | Nissl et al. ............. 726/26 |
| 6,728,880 B1 * | 4/2004 | Sites ............. 713/178 |
| 6,903,683 B1 * | 6/2005 | Nicholson ............. 342/357.09 |
| 2002/0069299 A1 * | 6/2002 | Rosener et al. ............. 709/248 |
| 2003/0016167 A1 * | 1/2003 | Dooley et al. ............. 342/357.06 |
| 2004/0119639 A1 * | 6/2004 | Gilkes ............. 342/357.15 |
| 2005/0062643 A1 * | 3/2005 | Pande et al. ............. 342/357.1 |

FOREIGN PATENT DOCUMENTS

| | | |
|---|---|---|
| JP | 63-163191 | 7/1988 |
| JP | 5-165545 | 7/1993 |
| JP | 5-303516 | 11/1993 |
| JP | 6-202757 | 7/1994 |
| JP | 10-032860 | 2/1998 |
| JP | 10-136456 | 5/1998 |
| JP | 2000-162346 | 6/2000 |
| JP | 2000-199792 | 7/2000 |
| JP | 2000-203498 | 7/2000 |
| JP | 2002-229869 | 8/2002 |
| JP | 2003-344572 | 12/2003 |

\* cited by examiner

*Primary Examiner*—Steve M. D'Agosta
(74) *Attorney, Agent, or Firm*—Greer, Burns & Crain, Ltd.

(57) ABSTRACT

A local time is modified according to a radio wave time received from a time calibration signal transmitting station, as well as corrected according to an authentic time that is received from a time server when the difference between the local time and the radio wave time is less than a predetermined value as well as when the difference is equal to or greater than the predetermined value for a predetermined number of successive times. The local time is corrected while taking into consideration a delay period included in receiving the authentic time.

15 Claims, 15 Drawing Sheets

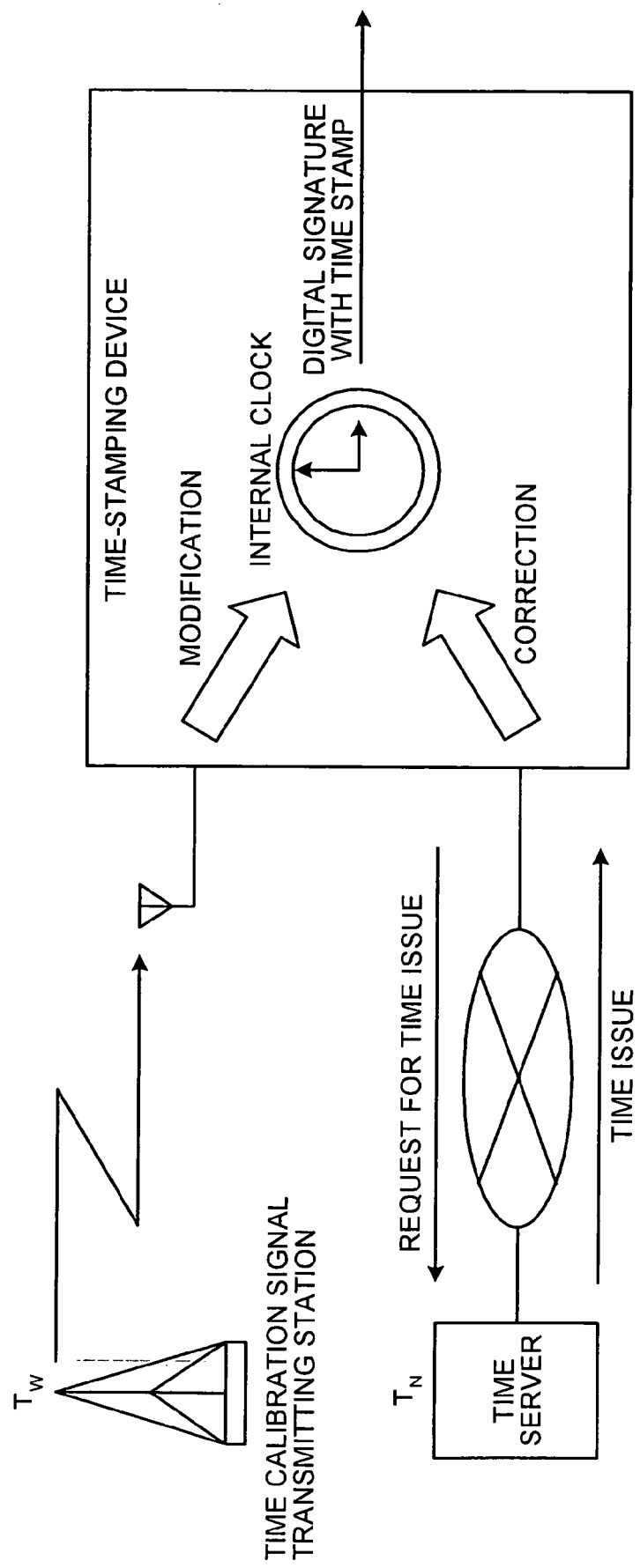

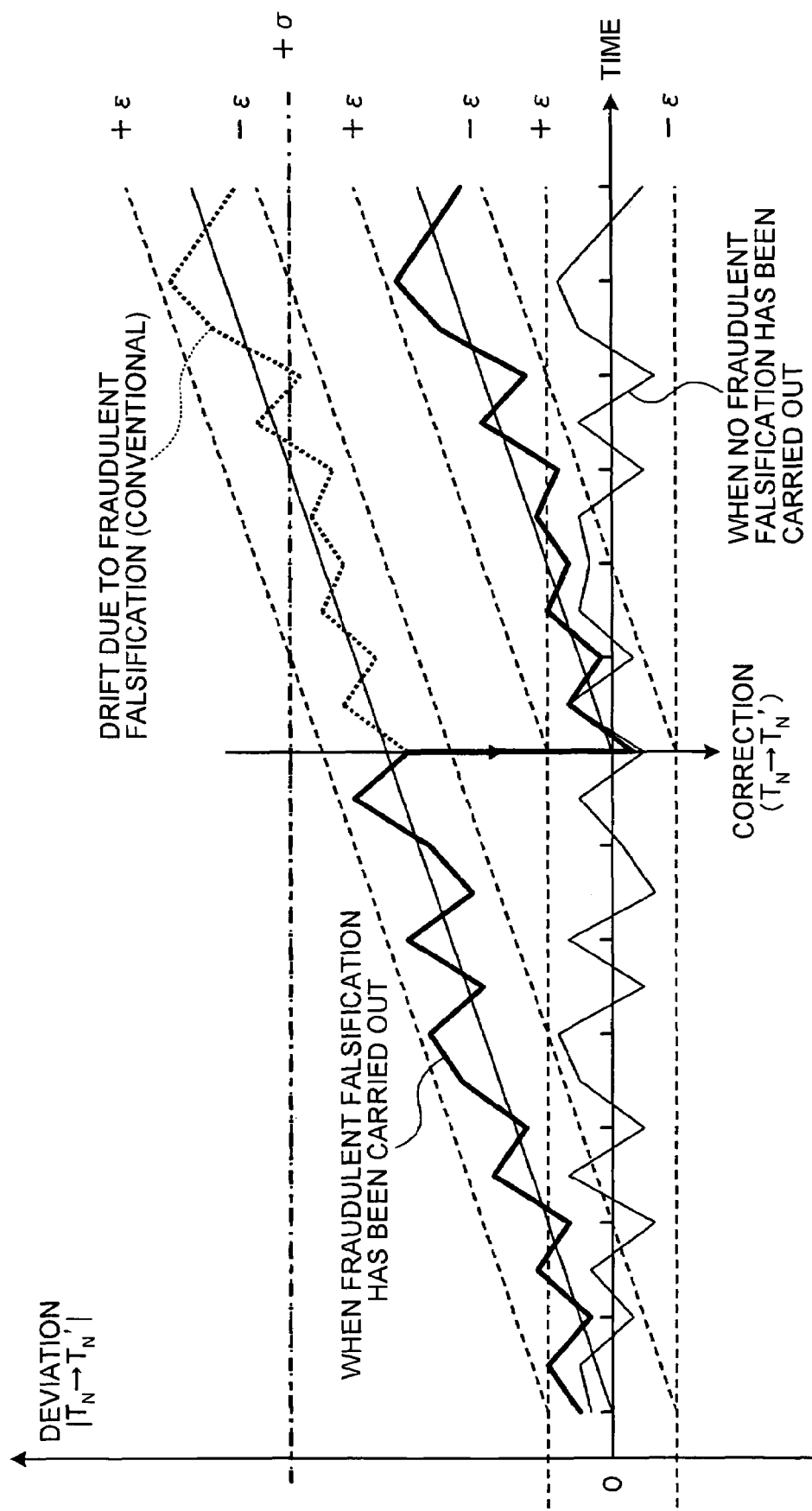

METHOD AND APPARATUS FOR TIME CALIBRATION

BACKGROUND OF THE INVENTION

1. Field of the Invention

The present invention relates to a technology for correcting a local time of a time-stamping device that affixes a digital signature including therein the local time to an electronic document.

2. Description of the Related Art

With the recent developments in the field of electronic authentication technology, digital signatures that authenticate a creator or publisher of electronic documents have come to be widely used. The digital signature uses technology such as encryption key, etc. to enhance its reliability. Further, attempts have been made to include the national standard time (hereinafter, "standard time") in the digital signature to authenticate the creation time or transmission time of the electronic document.

A device that affixes a digital signature with a time stamp is generally known as a time-stamping device. The time-stamping device has an internal clock. As well as clocking the local time according to the internal clock, the time-stamping device also corrects the local time by receiving radio waves that include the standard time, thereby enhancing the accuracy of the time stamped in the digital signature.

To affix a digital signature with a time stamp, it is essential to keep the difference between the local time of the time-stamping device and the standard time within a predetermined threshold value. That is, by ensuring that the difference between the time included in the digital signal and the standard time is kept within the predetermined threshold value, the time stamp of the electronic document that is to be digitally signed can be authenticated.

One method that may be employed for keeping the difference between the local time and the standard time within the predetermined threshold level is by receiving the radio wave, as described earlier. Another method is by connecting to a standard time managing server connected to a network and obtaining the standard time from the server. For instance, the standard time managing server disclosed in Japanese Patent Laid-Open Publication No. 2002-229869 transmits the standard time with an expiration data to a client device that is constantly connected to the server, and detects any deviation or tampering with the internal clock of the client device.

However, in the conventional time-stamping device fraudulent falsification of the local time cannot be prevented. For instance, the local time of the time-stamping device can be manipulated to be much ahead of or behind the authentic time with the aid of a radio wave including therein a false standard time instead of the true standard time. Thus, the time stamp on the electronic document cannot be authenticated with this kind of doctored local time.

Even if a mechanism is provided that monitors the difference between the local time of the time-stamping device and the standard time included in the radio wave and determines that the clock has been tampered with if the difference exceeds the predetermined threshold value, the mechanism will not be able to detect falsification of the local time when there is a combined influence of exposure of the time-stamping device to either a high temperature or a low temperature and a false radio wave.

Further, with the public preference for compact devices, the need of the hour is a compact time-stamping device that does not require to be connected all the time to a network, such as a local area network (LAN), and that can be carried around like a wrist watch or a mobile, and used whenever required.

The conventional technology disclosed in Japanese Patent Laid-Open Publication No. 2002-229869 cannot be applied to a compact time-stamping device since the technology needs the client device to be constantly connected to the network such as the LAN so that it can always be in communication with the standard time managing server.

Thus, it is important to realize a time-stamping device that enhances the reliability of the time included in a digital signal by preventing fraudulent falsification of the time stamp as well as guarantees the authenticity of the time stamp without having to be constantly connected to a network.

SUMMARY OF THE INVENTION

A time-stamping device according to an aspect of the present invention, which affixes a digital signature including a local time clocked by an internal clock to electronic data, includes: a radio-transmitted-time receiving unit that receives a standard time included in a radio wave as a radio-transmitted time; an authentic-time receiving unit that receives an authentic time synchronized with the standard time from a time server; a calculating unit that calculates an absolute value of a difference between the radio-transmitted time and the local time; a time modifying unit that modifies, when the absolute value calculated is less than a first threshold value, the local time by setting the radio-transmitted time as the local time, and leaves, when the absolute value calculated is equal to or greater than the first threshold value, the local time as it is; and a time correcting unit that corrects the local time based on the authentic time received.

A time server according to another aspect of the present invention includes: a receiving unit that receives a local time signed with a digital signature of a client from the client; a calculating unit that calculates an absolute value of a difference between the local time received and a reception time of the local time; and a sending unit that sends the local time received and an authentic time to the client when the absolute value calculated is less than a threshold value, wherein the authentic time is the reception time signed with a digital signature of the time server.

A method according to still another aspect of the present invention, which is a method for correcting a difference between a local time clocked by an internal clock and a standard time, includes: receiving a standard time included in a radio wave as a radio-transmitted time; receiving an authentic time synchronized with the standard time from a time server; calculating an absolute value of a difference between the radio-transmitted time and the local time; modifying the local time by setting the radio-transmitted time as the local time when the absolute value calculated is less than a threshold value; and correcting the local time based on the authentic time received.

A computer-readable recording medium according to still another aspect of the present invention stores a computer program that causes a computer to execute the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic diagram of a time-stamping device according to an embodiment of the present invention;

FIG. 2 is a drawing representing time correction;

DETAILED DESCRIPTION OF THE PREFERRED EMBODIMENTS

Exemplary embodiments of the present invention are explained in detail with reference to the accompanying drawings.

A time-stamping device that incorporates a time correcting process, which is a feature of the present embodiment, is explained first with reference to FIG. 1 through FIG. 3C and FIG. 12 through FIG. 14.

Time-stamping device refers to a device that affixes a digital signature including therein a time stamp on any digital data such as an electronic document. It has become commonplace in recent years to exchange digital data over the network, thus spawning the enterprise of authenticating the creation date, transmission date of the digital data (the so-called "time business").

For example, apart from medical electronic document data such as a medical record or death certificate, or accounting or tax-related documents such as sales account document or receipts, electronic documents to substantiate the date of invention of patents, digital signature with a time-stamping device can be affixed on image data, video data, etc. to authenticate the correct time at which these digital data were created or transmitted. Further, the time-stamping device can be included in digital cameras and digital video cameras, thereby extending the application of time business to the fields where there is requirement of date and time stamping.

Management of the time included in the digital signature is very crucial in the time business. In other words, the mechanism not only should ensure accurate time, but also deter any fraudulent falsification of the time. The time is likely to be tampered with for fraudulent activities such as for concealing a medical blunder or for changing the date of invention in patents, etc. Thus, it is essential to deter such misdeeds by disabling alteration of time.

One aspect of the time business requires that the time is synchronized between a facility or a device that issues reliable time and the several time-stamping devices that receive the time issued from the facility or the device. Time servers serve as a reliable time source and provide standard time by connecting and presenting an authentication key to a time calibration signal transmitting station or a satellite that issues radio waves including therein the standard time.

The businesses that manufacture and sell time-stamping devices for expanding the time business must ensure that the difference between the "Time" stamped with the digital signature by the time-stamping device and the standard time does not exceed a predetermined value. This assurance will help establish time business.

However, the possible presence of defrauders who falsify the time in the digital signature by altering the time can be a real threat to the very time business as the time of creation or transmission cannot be authenticated.

Figure 12:
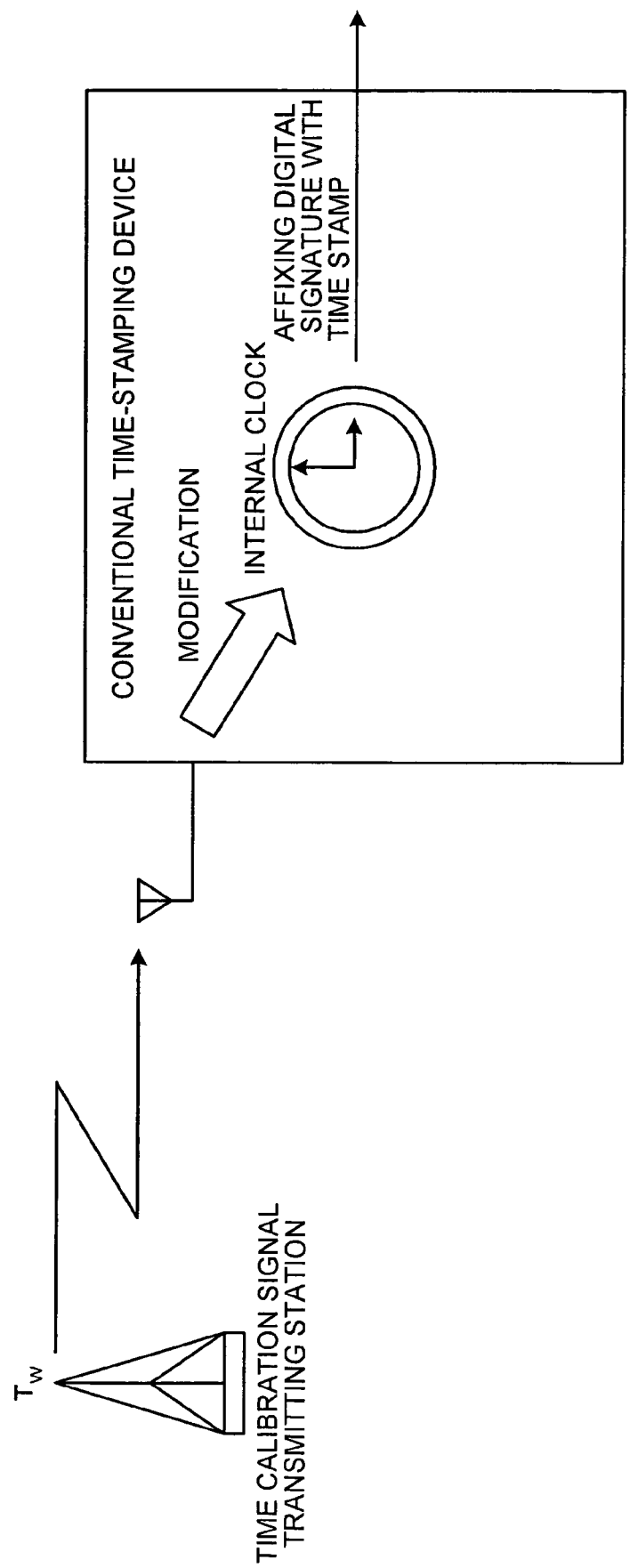
FIG. 12 is a schematic diagram of a conventional time-stamping device.

FIG. 12 is a schematic diagram of the conventional time-stamping device. An internal clock is provided inside the conventional time-stamping device. The time of the internal clock is modified by a radio time ($T_w$) included in the time calibration signal transmitted by the time calibration signal transmitting station. During digital signature the time stamp that is affixed is according to the modified internal clock. The conventional time-stamping device incorporates the so-called "radio clock" function and guarantees accuracy of time as long as it is not tampered with.

Figure 13:
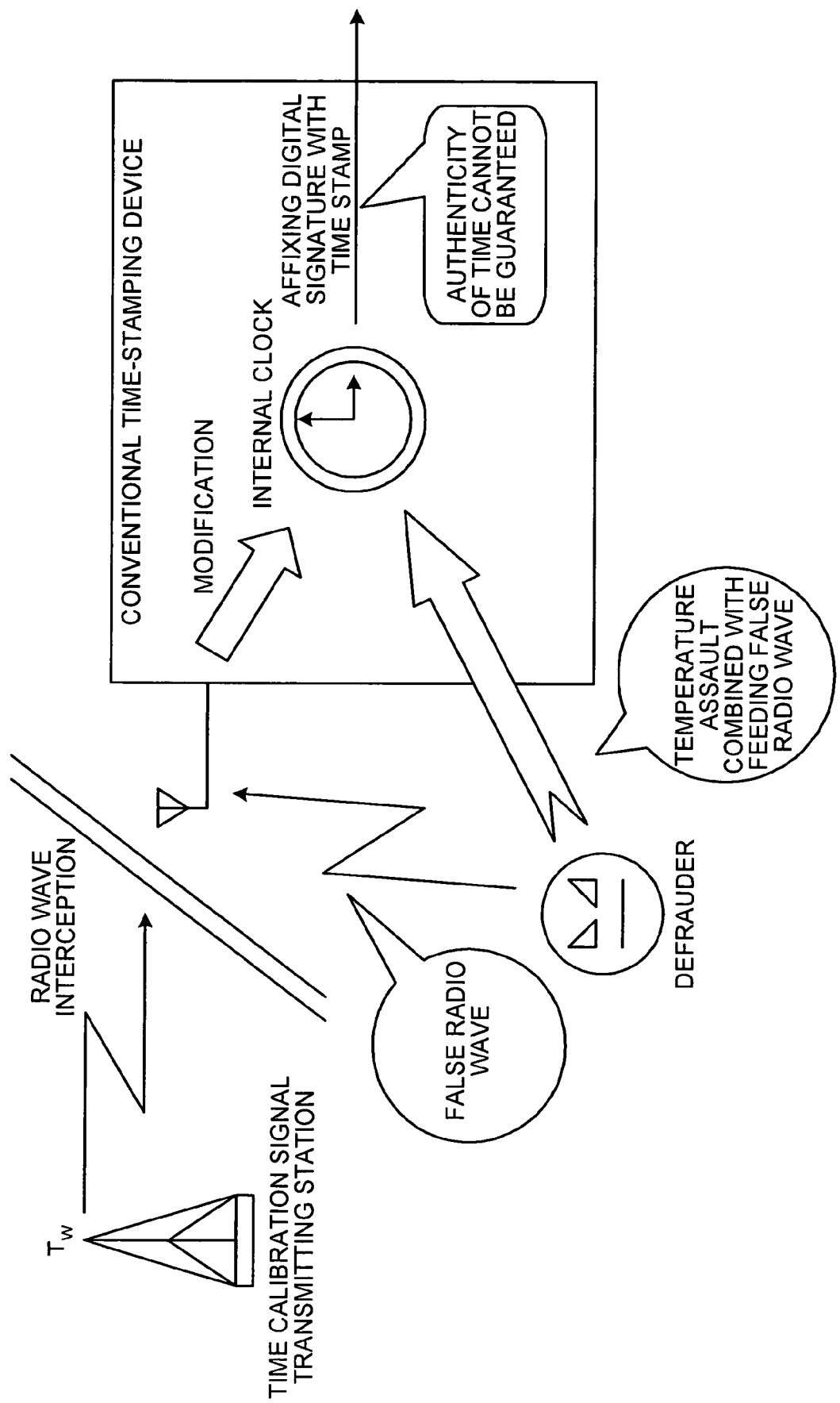
FIG. 13 is a drawing illustrating the process of altering the time of an internal clock of the conventional time-stamping device.

However, the conventional time-stamping device is prone to attack by defrauders and allows time to be altered. FIG. 13 is a drawing illustrating the process of altering the time of the internal clock of the conventional time-stamping device.

As shown in FIG. 13, the defrauder carries the time-stamping device to a place where the time calibration signal cannot reach, such as an underground cellar, and subjects the time-stamping device to a radio wave (false radio wave) that is of the same type as the time calibration signal but whose time is shifted from that of the standard clock. Upon receiving the false radio wave, the time-stamping device modifies the local time of the internal clock according to the false radio wave, thereby altering the local time to a time different from the genuine time.

In the time-stamping device that modifies the time of the internal clock according to the radio wave time, if the difference between the local time and the radio wave time exceeds a predetermined value ($\epsilon$), often, a preventive measure of using the unmodified local time is adopted. However, when the false radio wave is used in conjunction with subjecting the time-stamping device to either a high temperature or low temperature, this preventive measure fails.

All devices that have an internal clock generally have a crystal oscillator or a temperature compensated xtal oscillator (TCXO), which is basically a crystal oscillator provided with a temperature-compensating circuit that offers stability in the face of temperature variation. The time-stamping devices meant to be used in diverse locations and that involves several steps in terms of commodity circulation generally have a TCXO. The TCXO generally show a temperature characteristic that produces a quadratic curve which is basically convex, Y-axis representing deviation (with values being positive from 0 up) and X-axis representing temperature variation.

Thus, subjecting the time-stamping device that includes an oscillator to either a high temperature or a low temperature slows down the internal clock. In the case of a TCXO, within the temperature range that allows normal functioning of the temperature-compensating circuit, control is exerted to bring the deviation close to 0. However, if the temperature is above or below the range, the deviation gives rise to sudden time delay.

Figure 14:
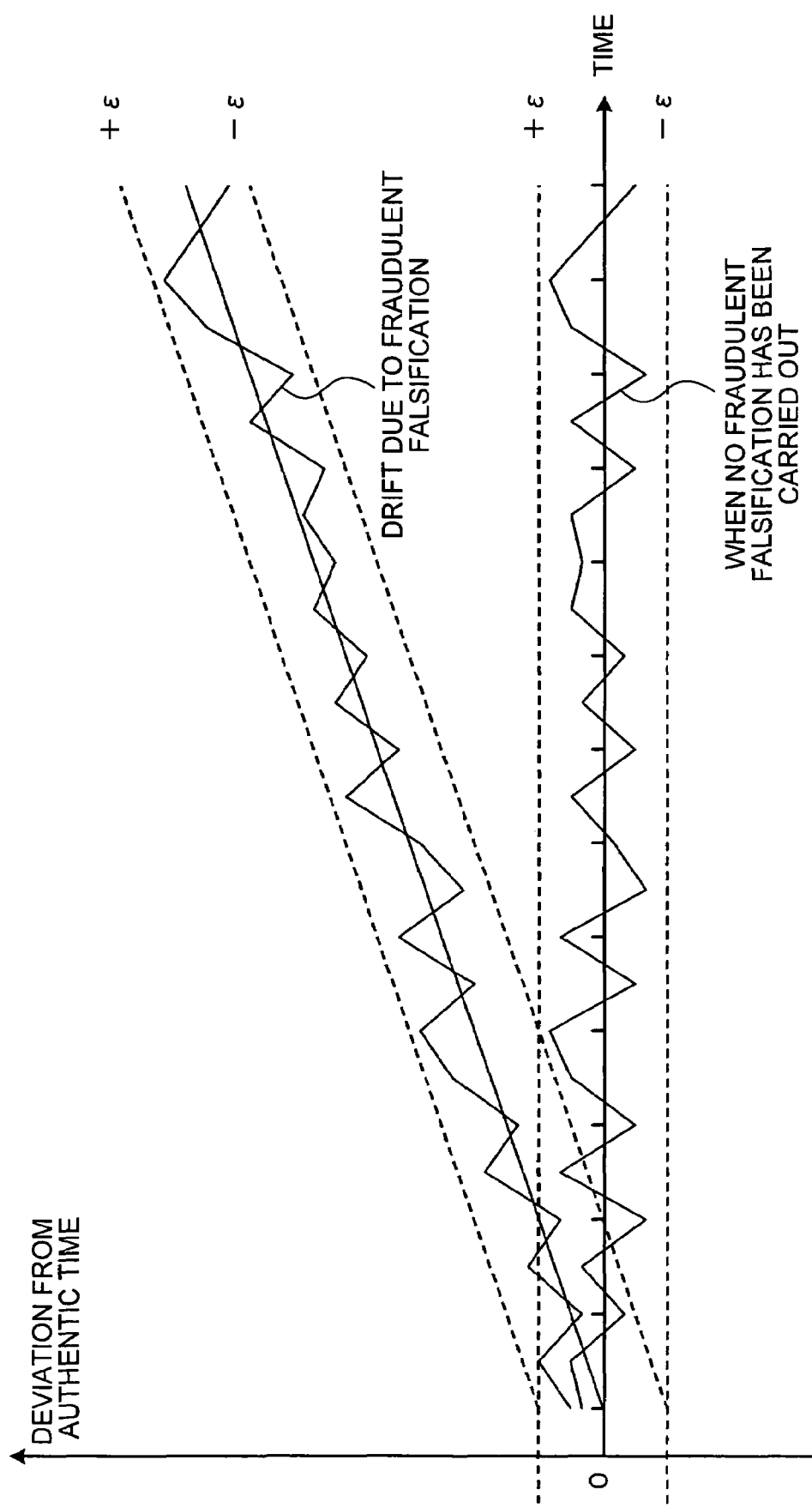
FIG. 14 is a drawing representing a drift in the time of the conventional time-stamping device due to tampering.

If the temperature assault is combined with feeding a false radio wave, the difference between the local time and the radio wave time (radio wave time of the false radio wave) can be kept within the predetermined value ($\epsilon$). Consequently, the local time can be made to drift (hereinafter "drift due to tampering") from the standard time by a large degree. FIG. 14 is a drawing representing a drift in the time of the conventional time-stamping device due to tampering.

As shown in FIG. 14, if no tampering has taken place, the deviation of the local time from the standard time (authentic time) is kept between $-\epsilon$ and $+\epsilon$ by the preventive mechanism, where ($\epsilon$) represents the predetermined threshold value. However, if a temperature assault is combined with feeding a false radio wave, the local time goes on drifting from the authentic time, while maintaining the deviation range of the local time from the time included in the false radio wave between $-\epsilon$ and $+\epsilon$.

Thus, in the conventional time-stamping device, the preventive measure against fraudulent falsification of the time is not adequate enough and hence time guarantee or time authentication, which is the object of a time-stamping device, cannot be assured. Therefore, the time-stamping device according to the present invention, which is provided with a time correction process, is equipped with a mechanism that deters fraudulent falsification of the time.

FIG. 1 is a schematic diagram of the time-stamping device according to the present embodiment. Apart from the radio wave time, the time-stamping device according to the present embodiment also receives an authentic time ($T_N$) from a time server via a network and corrects the local time of the internal clock according to the authentic time.

The time server refers to a device that is connected to a network such as the Internet and that provides, upon presentation of the authentication key, a highly reliable standard time maintained by it over the network. In the present embodiment, the time-stamping device is described as receiving the authentic time ($T_N$) from the time server. However, the time-stamping device may also receive the authentic time ($T_N$) from a server that is not provided with the standard time issuing function but is connected to a time issuing device having that function. Alternatively, the time-stamping device may receive the authentic time ($T_N$) from the time issuing device directly connected to the network.

FIG. 2 is a drawing representing time correction according to the authentic time. FIG. 2 corresponds to FIG. 14 related to the conventional time-stamping device. The reference symbol $T_N'$ in FIG. 2 represents the local time of the time-stamping device.

As shown in FIG. 2, in the time-stamping device according to the present embodiment, a threshold value ($\sigma$) is set for guaranteeing time and control is exerted so as to keep the difference between the local time and the genuine time within the threshold value ($\sigma$). When a predetermined condition is satisfied, the authentic time ($T_N$) is set to the local time ($T_N'$), thus limiting the difference between the local time and the standard time to within the threshold value ($\sigma$). The control process is described in detail later.

By carrying out the time correction in this manner, the drift in the local time can be kept within the predetermined value ($\sigma$) even if the time-stamping device is subjected to a temperature assault combined with feeding a false radio wave, which was not possible in the conventional time-stamping device.

Thus, the time-stamping device according to the present embodiment gives an accurate time stamp according to the radio clock for genuine users, and ensures that the deviation of the local time from the standard time does not exceed the predetermined value ($\sigma$) in the event of any attempted tampering. As the time-stamping device according to the present embodiment essentially shows time according to the time calibration signal, when the deviation due to tampering builds up, the time-stamping device according to the present invention receives the authentic time ($T_N$) and corrects the local time. Consequently, the need for the time-stamping device to be constantly connected to a network is obviated.

Figure 3A:
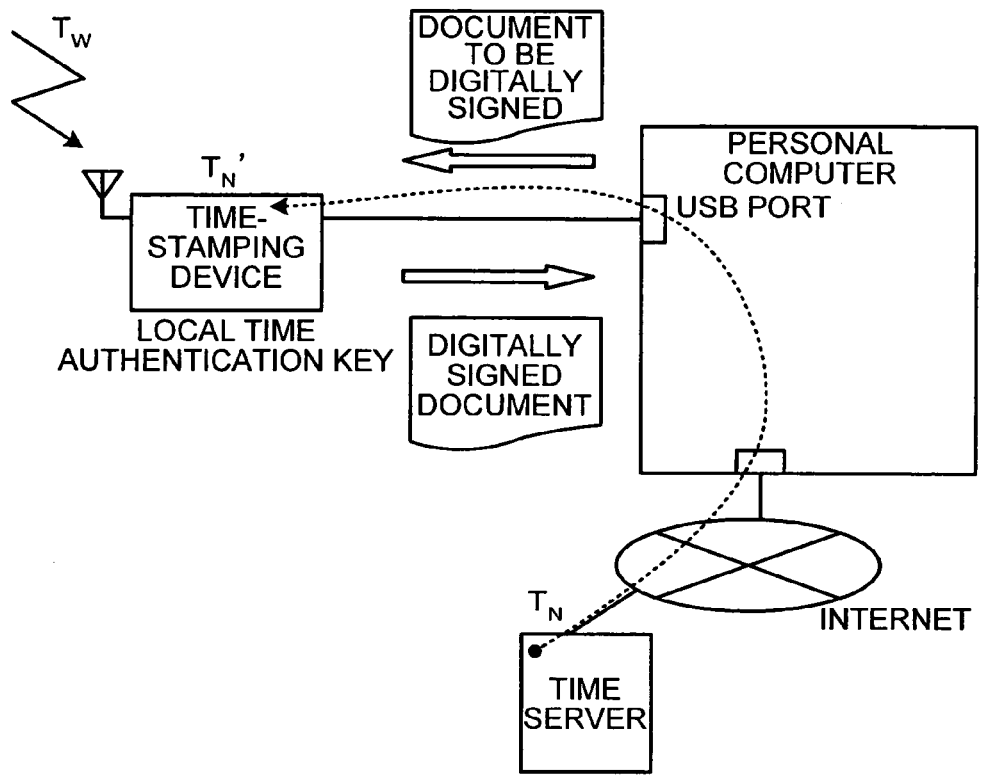
FIG. 3A is a drawing of a first example of the time-stamping device.
Figure 3B:
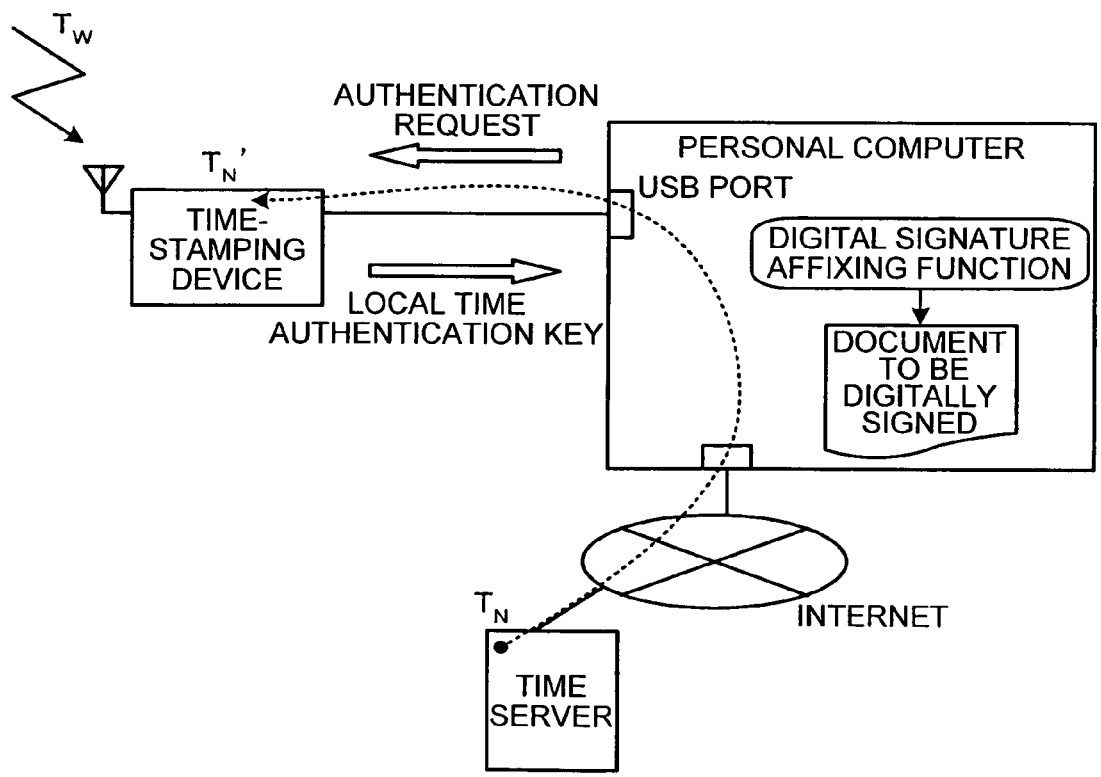
FIG. 3B is a drawing of a second example of the time-stamping device.
Figure 3C:
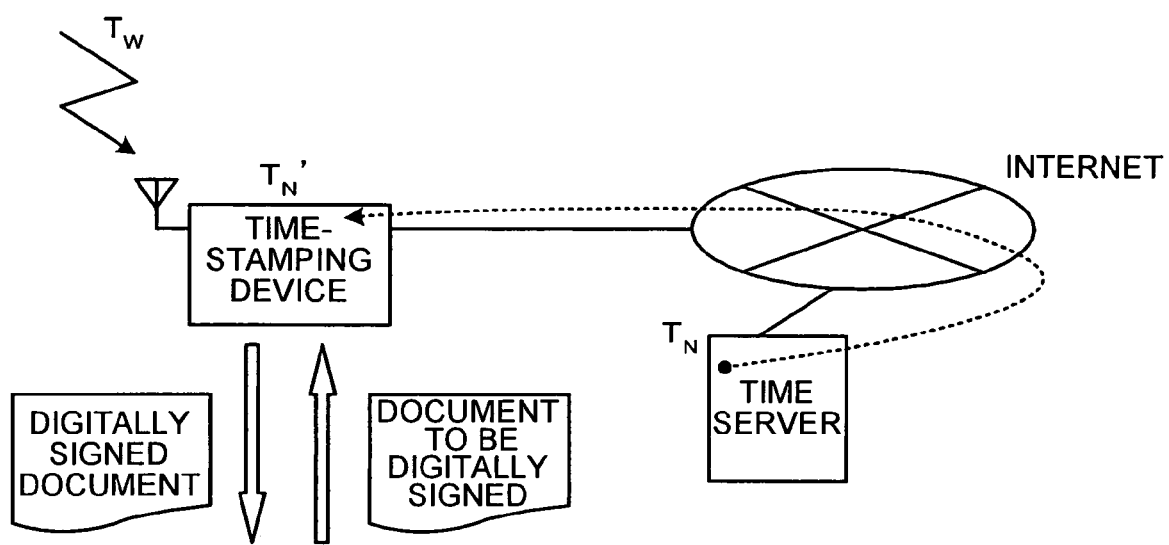
FIG. 3C is a drawing of a third example of the time-stamping device.

The different structures of the time-stamping device according to the present embodiment are explained next with reference to FIG. 3A through FIG. 3C. The structures shown in FIG. 3A through FIG. 3C are supposedly for portable time-stamping device that is constructed with a view to make it portable like a wrist watch or a mobile. However, it is also possible to adapt these structures for stationary time-stamping device.

FIG. 3A is a drawing of a first example of the time-stamping device. In this structure, the time-stamping device is connected to a universal serial bus (USB) port of a personal computer connected to the Internet. The time-stamping device thus connected receives the electronic document to be digitally signed from the personal computer, affixes a digital signature on the electronic document using its local time ($T_N'$) and the authentication key, and transfers the digitally signed document to the personal computer. When correcting time, the time-stamping device connects to the time server via the personal computer and the Internet, and receives the authentic time ($T_N$).

FIG. 3B is a drawing of a second example of the time-stamping device. The time-stamping device shown in FIG. 3B is similar to the one shown in FIG. 3A and is used by connecting to the USB port of the personal computer connected to the Internet. However, the function of affixing the digital signature is carried out by a program installed in the personal computer.

When a digital signature is required, the personal computer sends an authentication request message to the time-stamping device via the USB port. Upon receiving the message, the time-stamping device sends the local time and the authentication key to the personal computer. The personal computer then affixes the digital signature on the document using the function of affixing digital signature that the personal computer itself possesses. When correcting time, the time-stamping device shown in FIG. 3B, like the one shown in FIG. 3A, connects to the time server via the personal computer and the Internet.

FIG. 3C is a drawing of a third example of the time-stamping device. The time-stamping device shown in FIG. 3C is directly connected to the Internet. Upon receiving the electronic document to be digitally signed from an outside source, the time-stamping device affixes the digital signature using the local time ($T_N'$) and the authentication key, and outputs the digitally signed electronic document. The document to be digitally signed may be an electronic document stored in the internal memory of the time-stamping device. When correcting time, the time-stamping device shown in FIG. 3C connects to the time server via the internet and receives the authentic time ($T_N$).

In the time-stamping devices shown in FIG. 3A through FIG. 3C, the digital data to be digitally signed is assumed to be text data. However, image data or video data can also be digitally signed in the same manner. Further, the time-stamping device may be incorporated in devices such as digital cameras and the images as they are taken may be digitally signed.

Figure 4:
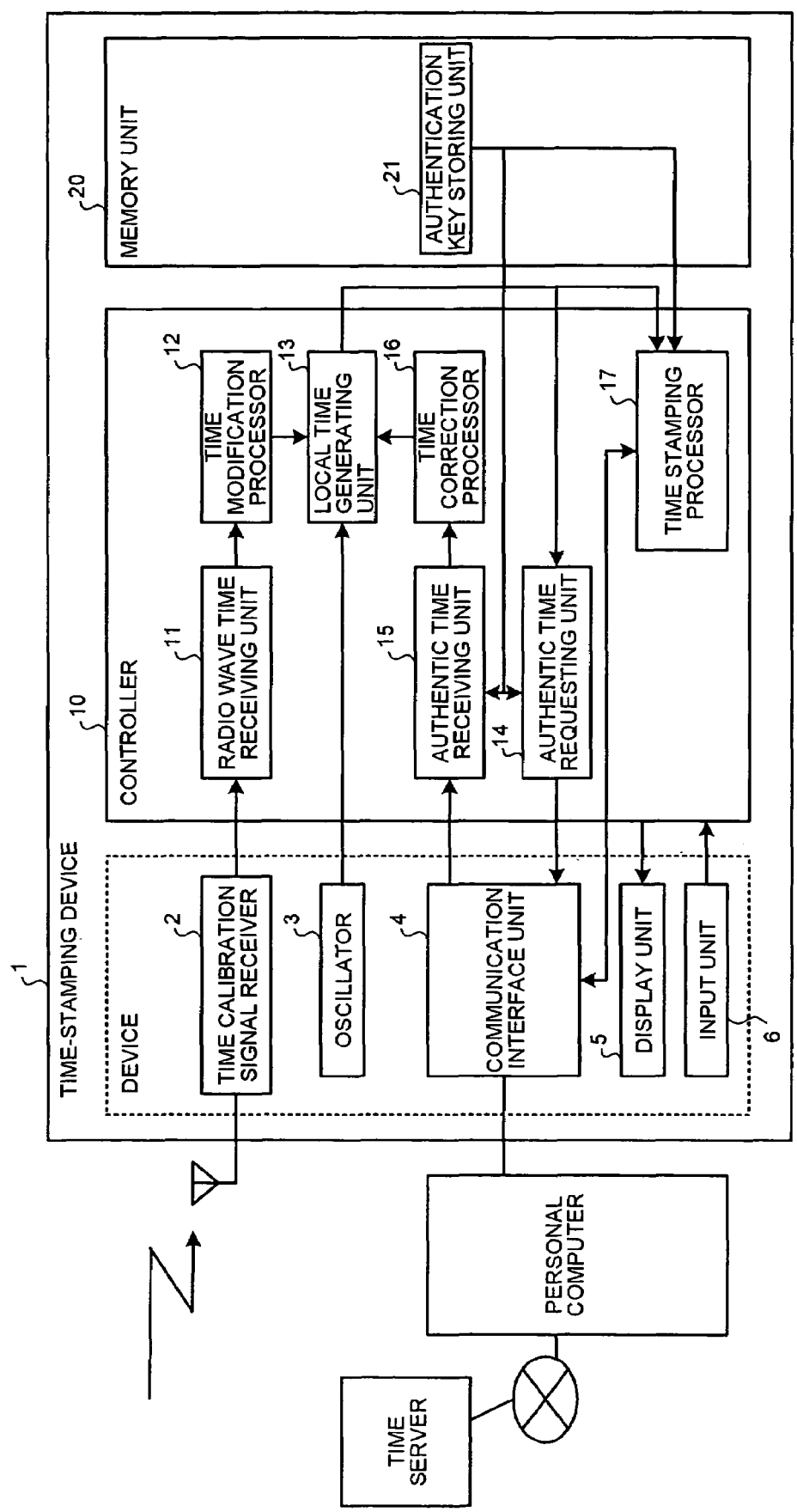
FIG. 4 is a block diagram of the time-stamping device.

FIG. 4 is a block diagram of the time-stamping device that includes the time correction process, which is the feature of the present embodiment. A time-stamping device 1 shown in FIG. 4 may take the structure of any of the time-stamping devices shown in FIG. 3A through FIG. 3C.

As shown in FIG. 4, the time-stamping device 1 includes a time calibration signal receiver 2, an oscillator 3, a communication interface unit 4, a display unit 5, and an input unit 6, and further includes a controller 10 and a memory unit 20.

The controller 10 includes a radio wave time receiving unit 11, a time modification processor 12, a local time generating unit 13, an authentic time requesting unit 14, an authentic time receiving unit 15, a time correction processor 16, and a time stamping processor 17. The memory unit 20 further includes an authentication key storing unit 21.

The time calibration signal receiver 2 receives the time calibration signal from a time calibration signal transmitting station or a satellite, and passes on the radio wave time ($T_W$) synchronized with the national standard time to the controller 10. For instance, the time calibration signal transmitted from the time calibration signal transmitting station includes time information such as hour, minute, second, number of days from the start of the year, year (last two digits according to western calendar), day of the week, etc. The time calibration signal receiver 2 may be set to receive the time calibration signal at any time. For instance, the time at which the time calibration signal receiver 2 receives the time calibration signal may be specified as 7:00 hrs and 19:00 hrs. Apart from the set time, the user can also bring about a forced reception of the time calibration signal at any time.

The oscillator 3 clocks the local time of the crystal oscillator and feeds the oscillated pulse to the controller 10. As the time-stamping device 1 is expected to be operated under a wide range of temperatures, and as an anticipatory measure against temperature assault with a view to tamper with the time, it is preferable that TCXO is used as the oscillator 3, so that accuracy of time is guaranteed under a wide range of temperatures.

The communication interface unit 4 is a device such as the USB port, LAN board, etc., that allows two-way communication, and facilitates data exchange between the time-stamping device 1 and the personal computer, as well as between the communication interface unit 4 and the controller 10. Further, the communication interface unit 4 also allows data exchange between the time-stamping device 1 and the time server.

The display unit 5 is a display device such as a liquid crystal display and displays alerts, error information, etc. from the controller 10 and other devices. The input unit 6 is a power on/off button and is used for switching the time-stamping device 1 on or off. The operation of the input unit 6 is notified to the controller 10.

The controller 10 generates the local time and appropriately carries out time modification according to the time calibration signal and time correction according to the authentic time, keeping the difference between the local time and the authentic time within the predetermined value, and affixes the digital signature using the local time.

The radio wave time receiving unit 11 receives the radio wave time ($T_W$) from the time calibration signal receiver 2 and passes it on to the time modification processor 12. The time modification processor 12 uses the radio wave time ($T_W$) received from the radio wave time receiving unit 11 to modify the local time ($T_N'$) generated by the local time generating unit 13.

Specifically, the time modification processor 12 calculates an absolute value ($|T_W - T_N'|$) of the difference between the radio wave time ($T_W$) and the local time ($T_N'$) and compares the absolute value ($|T_W - T_N'|$) with the predetermined threshold value ($\epsilon$). If the absolute value ($|T_W - T_N'|$) is less than the threshold value ($\epsilon$) (that is, if $|T_W - T_N'| < \epsilon$), the time modification processor 12 replaces the local time ($T_N'$) with the radio wave time ($T_W$). When the absolute value $|T_W - T_N'|$ is less than the threshold value $\epsilon$ a predetermined number of successive times, it acts as a trigger for the authentic time requesting unit 14 to make a request to the time server for the authentic time.

If the absolute value ($|T_W - T_N'|$) is equal to or greater than the threshold value ($\epsilon$) (that is, if $|T_W - T_N'| \geq \epsilon$), the time modification processor 12 does not modify the local time ($T_N'$). When the absolute value ($|T_W - T_N'|$) is equal to or greater than the threshold value ($\epsilon$) a predetermined number of successive times, it acts as a trigger for the authentic time requesting unit 14 to make a request to the time server for the authentic time.

The local time generating unit 13 receives the pulse output from the oscillator 3 and generates the local time ($T_N'$) based on the pulse. The local time ($T_N'$) is subjected to time modification process by the time modification processor 12 according to the radio wave time ($T_W$) as well as to the time correction process by the time correction processor 16 according to the authentic time ($T_N$). The local time generating unit 13 notifies the generated local time ($T_N'$) to the authentic time requesting unit 14 and the time stamping processor 17.

The authentic time requesting unit 14, at specified times, makes a request to the time server connected to the network for the issue of the authentic time using the local time ($T_N'$) generated by the local time generating unit 13 and the authentication key stored in the authentication key storing unit 21. When making the request for the issue of the authentic time, the authentic time requesting unit 14 encrypts the request message containing the local time ($T_N'$) using the authentication key and sends the encrypted request message to the communication interface unit 4.

The authentic time requesting unit 14 can be forcibly made to request for the authentic time by the user. In addition, the authentic time requesting unit 14 makes a request for the authentic time upon triggered by "number of successive times $|T_W - T_N'| < \epsilon$" and "number of successive times $|T_W - T_N'| \geq \epsilon$" calculated by the time modification processor 12.

For instance, assuming that $\epsilon$ is 0.5 second, and that the time modification processor 12 performs time modification according to the radio wave time ($T_W$) once a day, and that the authentic time requesting unit 14 makes a request to the time server for the issue of the authentic time when "number of successive times $|T_W - T_N'| < \epsilon$" becomes 90, the correction process according the authentic time ($T_N$) is performed when the local time ($T_N'$) deviates from the genuine time by a maximum of 45 seconds (90×0.5). Thus, the deviation of the local time ($T_N'$) can be kept within the predetermined value even if a false radio wave is fed combined with temperature assault.

Forcible request for the issue of the authentic time is accomplished by the user at any time by pressing the appropriate button to bring about forcible request for the authentic time with the aid of the input unit 6, causing the authentic time requesting unit 14 to make a request to the time server on the network for the issue of the authentic time. Forcible request may also be accomplished by displaying "number of successive times $|T_W-T_N'|<\epsilon$ or period in which $|T_W-T_N'|<\epsilon$" or "number of successive times $|T_W-T_N'|\geq\epsilon$ or period in which $|T_W-T_N'|\geq\epsilon$" on the display unit 5 and urging the user to select forcible request.

The authentic time requesting unit 14 may not await user operation to act as a trigger for making a request for the authentic time but may on its own periodically make a request to the time server for the authentic time based on the local time ($T_N'$) generated by the local time generating unit 13. For instance, if the deviation of the local time from the standard time is 0.5 second per day, to keep the difference between the standard time and the local time within 45 seconds, the authentic time requesting unit 14 may be instructed to make a request to the time server for the authentic time once every 90 days.

The authentic time receiving unit 15 receives the authentic time ($T_N$), issued by the time server in response to the request made by the authentic time requesting unit 14, via the communication interface unit 4, and passes on the authentic time ($T_N$) to the time correction processor 16. The authentic time receiving unit 15 decrypts the encrypted authentic time ($T_N$) using the authentication key stored in the authentication key storing unit 21.

The time correction processor 16 corrects the local time ($T_N'$) generated by the local time generating unit 13 according to the authentic time ($T_N$) received from the authentic time receiving unit 15. The reason for calling the time adjustment process as "modification" when it is performed based on the radio wave time, and the "correction" when it is performed based on the authentic time is explained next.

The radio wave time formerly was considered as a standard for the local time as the radio waves could be depended upon for their lack of delay and hence accuracy. However, since the radio wave time can be manipulated as explained with reference to FIG. 2, the radio wave time cannot be assumed to be completely reliable.

On the other hand, the authentic time is more reliable than the radio wave time as an authentication key is required to receive the authentic time. Therefore, to differentiate the time adjustments made according to the radio wave time and the authentic time, different names—adjustment and correction, respectively, have been given for the processes.

The time correction processor 16 calculates an absolute value ($|T_N-T_N'|$) of the difference between the authentic time ($T_N$) and the local time ($T_N'$) and compares the absolute value ($|T_N-T_N'|$) with the predetermined threshold value ($\sigma$). If the absolute value ($|T_N-T_N'|$) is less than the threshold value ($\sigma$) (that is, if $|T_N-T_N'|<\sigma$), the time correction processor 16 replaces the local time ($T_N'$) with the authentic time ($T_N$).

If the absolute value ($|T_N-T_N'|$) is equal to or greater than the threshold value ($\sigma$) (that is, if $|T_N-T_N'|\geq\sigma$), the time correction processor 16 instructs the authentic time requesting unit 14 to make a request for the authentic time ($T_N$) without correcting the local time ($T_N'$).

The time stamping processor 17 affixes the digital signature, including therein a time stamp, on the electronic document using the local time and the authentication key stored in the authentication key storing unit 21. Prior to being used by the time stamping processor 17, the local time, which is generated by the local time generating unit 13, is subjected to time modification and time correction by the time modification processor 12 and the time correction processor 16, respectively. Specifically, the time stamping processor 17 receives the electronic document to be digitally signed via the communication interface unit 4, affixes a digital signature on the electronic document, and outputs the digitally signed electronic document via the communication interface unit 4.

The memory unit 20 is a storage device and is a volatile random access memory (RAM) and includes the authentication key storing unit 21, which is pre-allocated at the manufacturing stage, in which the authentication key is stored. Once the authentication key is stored in the authentication key storing unit 21, the memory unit 20 is constantly powered. The powering of the memory unit 20 is to prevent any illegal access of the authentication key. In other words, when an attempt is made to tamper with the time-stamping device 1 to get hold of the authentication key, the power supply to the memory unit 20 is halted, thereby erasing the authentication key stored therein.

Figure 5:
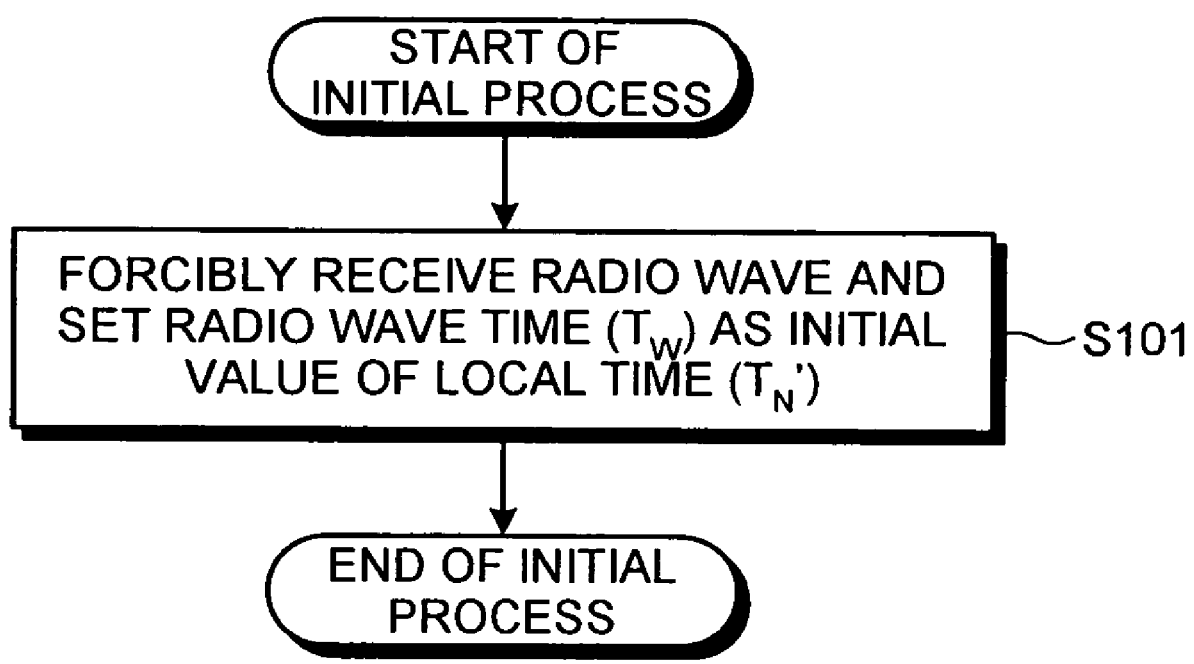
FIG. 5 is a flowchart of an initial process when time correction is not carried out.
Figure 6:
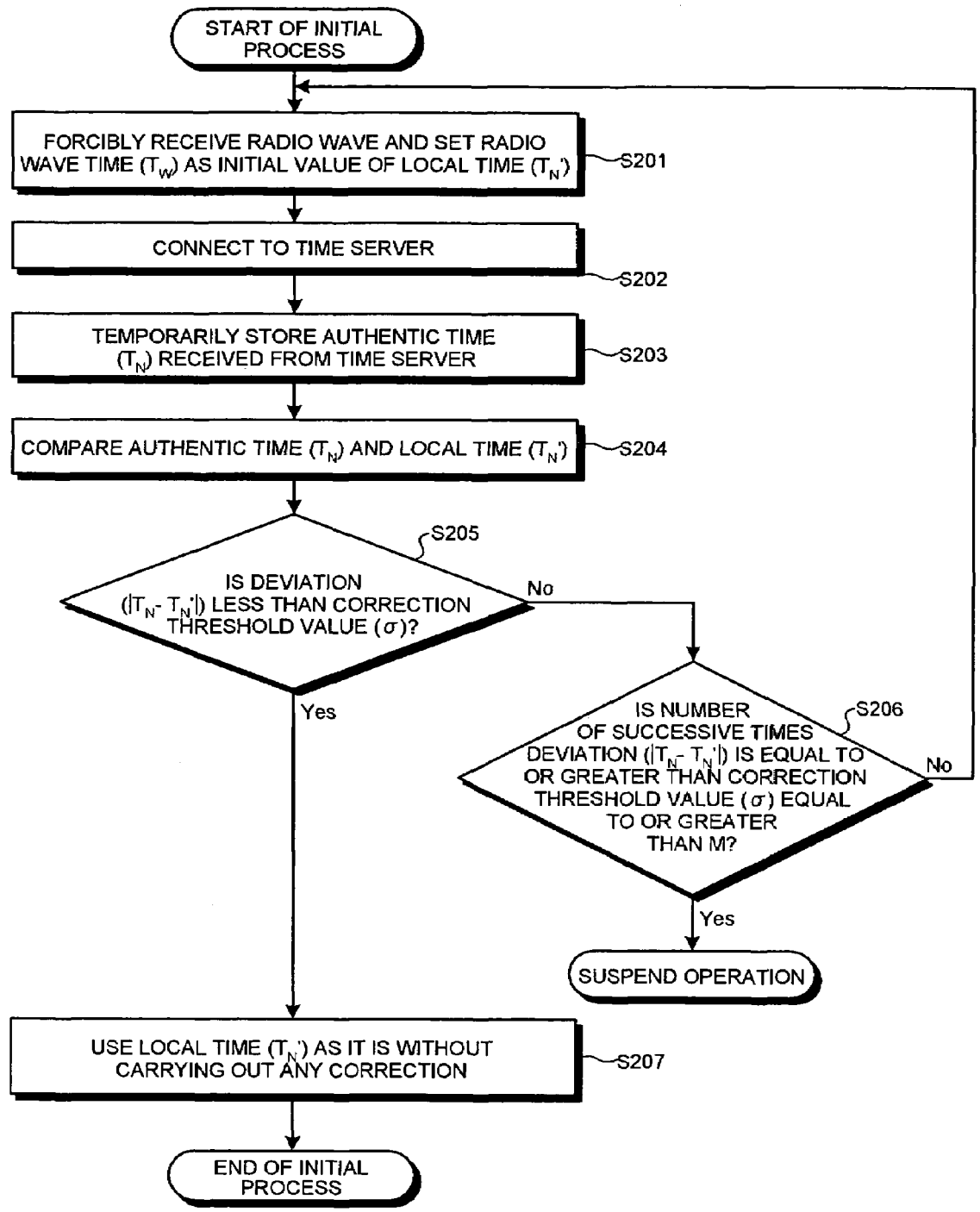
FIG. 6 is a flowchart of the initial process when time correction is carried out.

FIG. 5 is a flowchart of the initial process when time correction is not carried out. FIG. 6 is a flowchart of the initial process when time correction is carried out.

When no time correction based on the authentic time is carried out, as shown in FIG. 5, the radio wave time receiving unit 11 forcibly receives the radio wave time ($T_W$) via the time calibration signal receiver 2, and the time modification processor 12 modifies the local time ($T_N'$) generated by the local time generating unit 13 by replacing the local time ($T_N'$) with the radio wave time ($T_W$), thus setting the radio wave time ($T_W$) as the local time ($T_N'$) (step S101) and ending the initial process.

When time correction based the authentic time is to be carried out, as shown in FIG. 6, the radio wave time receiving unit 11 forcibly receives the radio wave time ($T_W$) via the time calibration signal receiver 2, and the time modification processor 12 modifies the local time ($T_N'$) generated by the local time generating unit 13 by replacing the local time ($T_N'$) with the radio wave time ($T_W$), thus setting the radio wave time ($T_W$) as the local time ($T_N'$) (step S201).

Next, the authentic time requesting unit 14 connects to the time server to make a request for the authentic time ($T_N$) (step S202). The authentic time receiving unit 15 temporarily stores the authentic time ($T_N$) received from the time server (step S203). The time correction processor 16 compares the temporarily stored authentic time ($T_N$) and the local time ($T_N'$) generated by the local time generating unit 13 (step S204), and determines if the deviation ($|T_N-T_N'|$) between the authentic time ($T_N$) and the local time ($T_N'$) is less than the correction threshold value ($\sigma$) (step S205).

If the deviation ($|T_N-T_N'|$) is less than the correction threshold value ($\sigma$) ("Yes" at step S205), the time correction processor 16 uses the local time ($T_N'$) as it is without carrying out any correction (Step S207). If the deviation ($|T_N-T_N'|$) is found to be equal to or greater than the correction threshold value ($\sigma$) ("No" at step S205), the time correction processor 16 determines whether the number of successive times the deviation ($|T_N-T_N'|$) is equal to or greater than the correction threshold value ($\sigma$) is equal to or greater than M (step S206).

If the number of successive times the deviation ($|T_N-T_N'|$) is equal to or greater than the correction threshold value ($\sigma$) is equal to or greater than a predetermined value M ("Yes" at step S206), the time correction processor 16 suspends the operation of the time-stamping device 1. If the number of successive times the deviation ($|T_N-T_N'|$) is equal to or greater than the correction threshold value ($\sigma$) is less than the predetermined value M ("No" at step S206), the steps from step S201 onward are repeated. Either of the initial processes shown in FIG. 5 and FIG. 6 may be appropriately selected depending on the operation mode of the time-stamping device 1. Alternatively, the initial process to be used may be specified beforehand.

Figure 7:
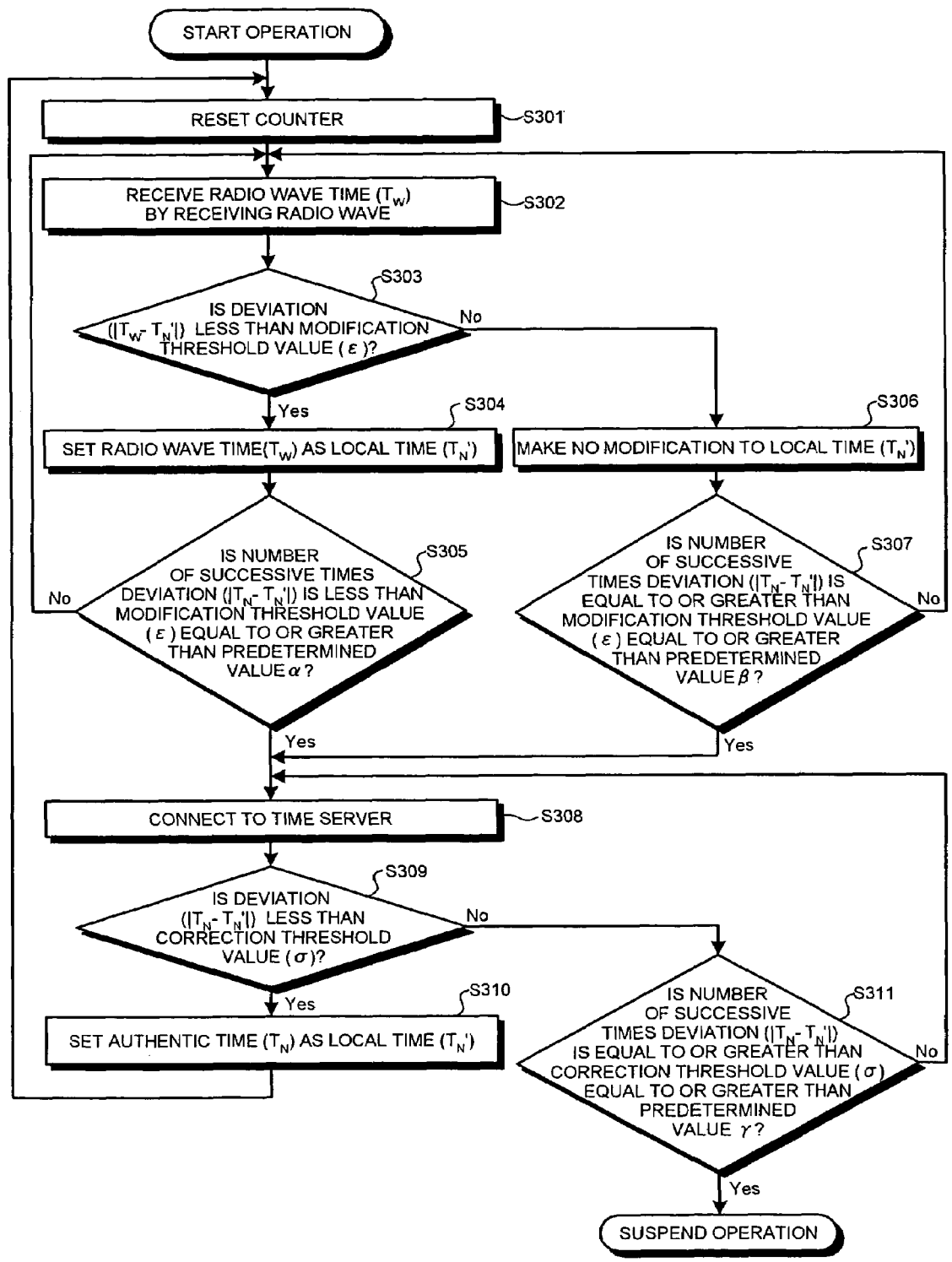
FIG. 7 is a flowchart of the processes of time modification and time correction.

The functioning of the time-stamping device 1 is explained with reference to FIG. 7. FIG. 7 is a flowchart of the processes of time modification and time correction. As shown in FIG. 7, upon activating the time-stamping device 1, first a counter that counts the number of successive times the deviation exceeds the threshold value is reset (step S301). The radio wave time receiving unit 11 then receives the radio wave time ($T_W$) via the time calibrating signal receiver 2 (step S302).

The time modification processor 12 calculates the difference between the radio wave time ($T_W$) and the local time ($T_N'$) and determines whether the deviation ($|T_W-T_N'|$) is less than the modification threshold value ($\epsilon$) (step S303). If the deviation ($|T_W-T_N'|$) is less than the modification threshold value ($\epsilon$) ("Yes" at step S303), the time modification processor 12 performs a modification process by setting the radio wave time ($T_W$) as the local time ($T_N'$) (step S304).

Next, the time modification processor 12 determines whether the number of successive times the deviation ($|T_W-T_N'|$) is less than the modification threshold value ($\epsilon$) is equal to or greater than a predetermined value $\alpha$ (step S305). If the number of successive times the deviation ($|T_W-T_N'|$) is less than the modification threshold value ($\epsilon$) is found to be equal to or greater than $\alpha$ ("Yes" at step S305), the steps from Step S308 onward are carried out. If the number of successive times the deviation ($|T_W-T_N'|$) is less than the modification threshold value ($\epsilon$) is found to be less than the predetermined value $\alpha$ ("No" at step S305) the steps from Step S302 onward are repeated.

If the deviation ($|T_W-T_N'|$) is equal to or greater than the modification threshold ("No" in step S303), the time modification processor 12 makes no modification to the local time ($T_N'$) (step S306). The time modification processor 12 then determines whether the number of successive times ($|T_W-T_N'|$) is equal to or greater than the modification threshold value ($\epsilon$) is equal to or greater than a predetermined value $\beta$ (step S307). If the number of successive times the deviation ($|T_W-T_N'|$) is equal to or greater than the modification threshold value ($\epsilon$) is found to be equal to or greater than a predetermined value $\beta$ ("Yes" at step S307), the steps from step S308 onward are carried out. If the number of successive times the deviation ($|T_W-T_N'|$) is less than the modification threshold value ($\epsilon$) is found to be less than the predetermined value $\beta$ ("No" at step S307), the steps from step S302 onward are repeated.

If the answer is "Yes" at steps S305 and S307, the authentic time requesting unit 14 connects to the time server for making a request for the authentic time ($T_N$) (step S308). The time correction processor 16 receives the authentic time ($T_N$) via the authentic time receiving unit 15, calculates the difference between the received authentic time ($T_N$) and the local time ($T_N'$), and determines whether the deviation ($|T_N-T_N'|$) is smaller than the correction threshold value ($\sigma$) (step S309).

If the deviation ($|T_N-T_N'|$) is less than the correction threshold value ($\sigma$) ("Yes" at step S309), the time correction processor 16 sets the authentic time $T_N$ as the local time $T_N'$ (step S310), and the steps from step S201 onward are repeated. If the deviation ($|T_N-T_N'|$) is equal to or greater than the correction threshold value ($\sigma$) ("No" at step S309), the time correction processor 16 determines whether the number of successive times the deviation ($|T_N-T_N'|$) is equal to or greater than the correction threshold value ($\sigma$) is equal to or greater than a predetermined value $\gamma$ (step S311). If the deviation ($|T_N-T_N'|$) is equal to or greater than the correction threshold value ($\sigma$) is found to be equal to or greater than the predetermined value $\gamma$ ("Yes" at step S311), the time correction processor 16 suspends the operation of the time-stamping device 1. If the number of successive times the deviation ($|T_N-T_N'|$) is equal to or greater than the correction threshold value ($\sigma$) is found to be less than the predetermined value $\gamma$ ("No" at step S311), the steps from step S308 onward are repeated.

Figure 8:
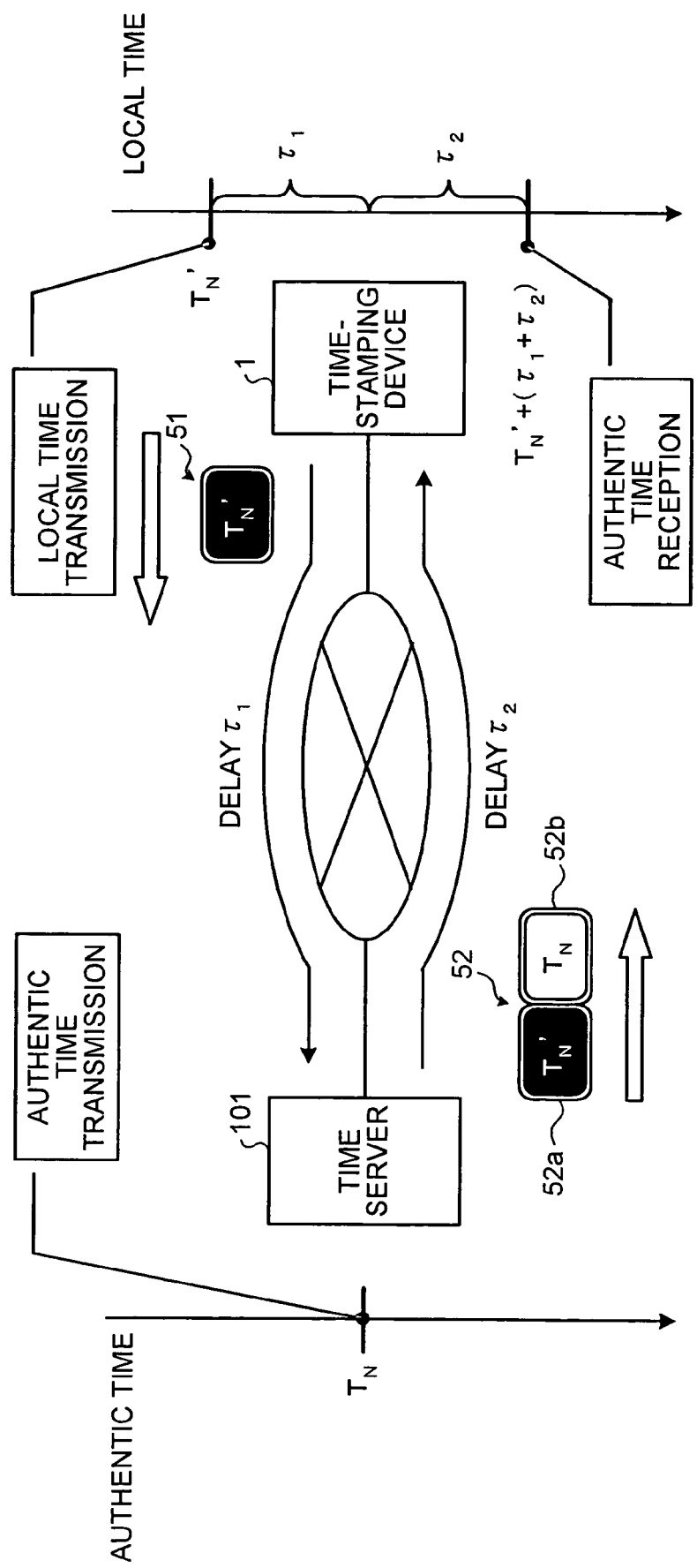
FIG. 8 is a schematic diagram illustrating a delay compensation process.

A process of compensation for the delay when receiving the authentic time ($T_N$) from the time server is explained next with reference to FIG. 8 through FIG. 10. FIG. 8 is a schematic diagram illustrating the delay compensation process the authentic time is subjected to. A network delay must be accounted for from the time the time-stamping device 1 makes a request to the time server 101 for the authentic time ($T_N$) until the time it receives the authentic time ($T_N$).

Specifically, suppose the time taken for the request for the authentic time $T_N$ from the time-stamping device 1 to reach the time server 101 is $\tau_1$ and the time taken for the authentic time ($T_N$) to reach the time-stamping device 1 from the time server 101 is $\tau_2$. In other words, the time-stamping device 1 would receive the authentic time ($T_N$) from the time server 101 after a delay of $\tau_2$. This delay does not pose a problem if the delay is of the order of 100 msec. However, if a delay is caused in the network by tampering, the authentic time ($T_N$) received by the time-stamping device 1 would not be accurate.

To obtain the accurate authentic time ($T_N$), the time-stamping device 1 determines the sum of $\tau_1$ and $\tau_2$, and from this value estimates $\tau_2$. Specifically, when sending a request to the time server 101, the authentic time requesting unit 14 includes in an authentic time request message 51 the local time ($T_N'$) at the instant when the request for authentic time is made. Upon receiving the authentic time request message 51, the time server 101 responds by sending a response message 52 that includes the authentic time as well as the received local time ($T_N'$) to the time-stamping device 1. In FIG. 8, the reference symbol 52a represents the local time ($T_N'$) and the reference symbol 52b represents the authentic time ($T_N$) included in the response message 52.

To calculate the to and fro time ($\tau_1+\tau_2$) for sending the request and receiving the response, the time-stamping device 1 deducts 52a ($T_N'$) included in the response message 52 from the reception time ($T_N'+(\tau_1+\tau_2)$) of the response message 52. The time-stamping device 1 then calculates the delay-compensated authentic time by first obtaining $\tau_2$ by halving ($\tau_1+\tau_2$), and then deducting $\tau_2$ from the received authentic time ($T_N$).

In the present embodiment, $\tau_2$ is calculated by halving the delay period ($\tau_1+\tau_2$) for a single request. However, an average of the delay periods ($\tau_1+\tau_2$) for a plurality of requests may be used to calculate $\tau_2$. Alternatively, an average of the delay periods ($\tau_1+\tau_2$) for requests to a plurality of time servers 101 may be used to calculate $\tau_2$.

Figure 9:
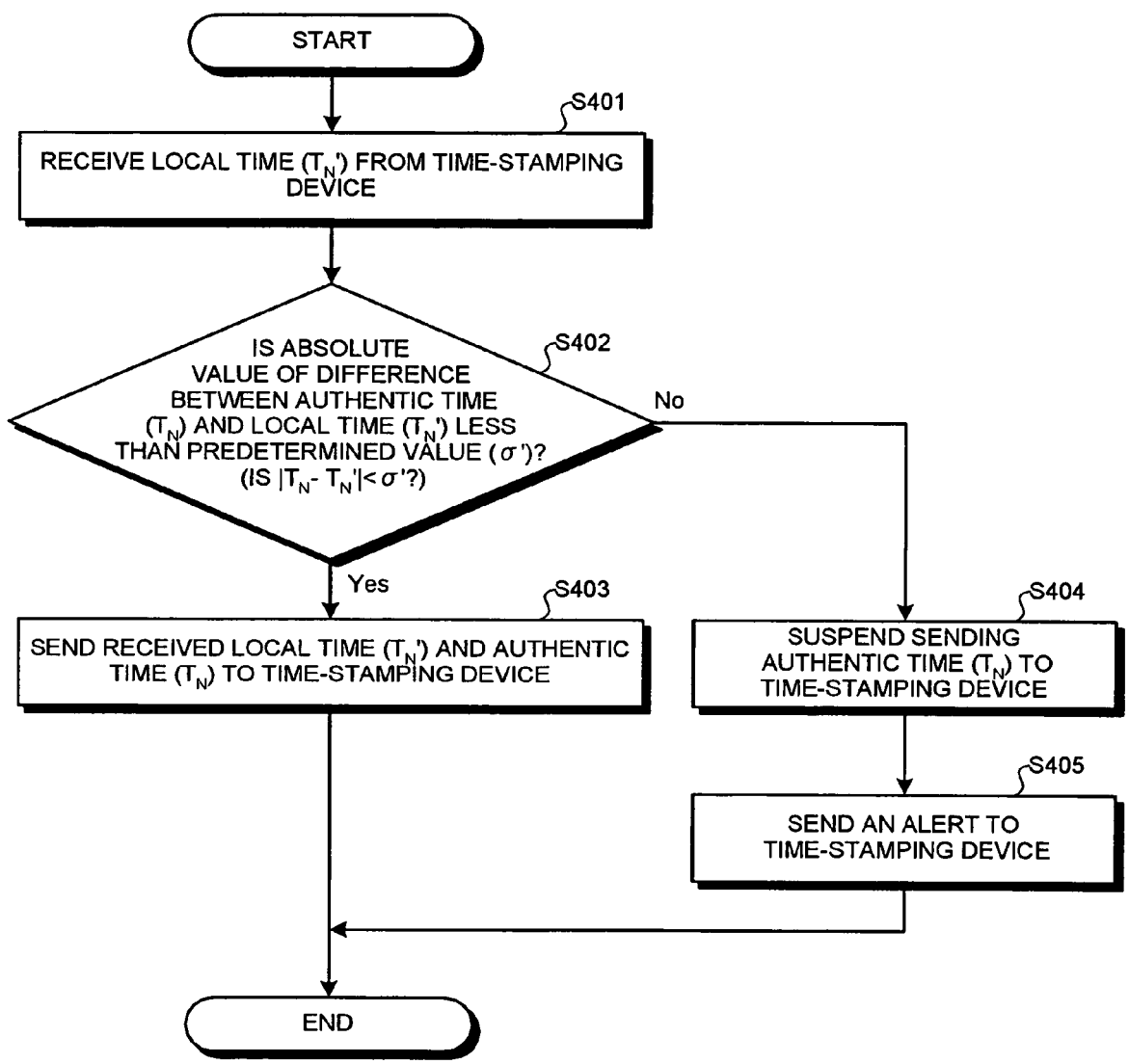
FIG. 9 is a flowchart of the delay compensation process performed by the time server.

FIG. 9 is a flowchart of the delay compensation process performed by the time server. As shown in FIG. 9, upon receiving the local time ($T_N'$) from the time-stamping device 1 (step S401), the time server 101 determines whether the absolute value of the difference between the authentic time ($T_N$) maintained by the time server 101 itself and the received local time ($T_N'$) is less than a predetermined value ($\sigma'$) (step S402).

If the absolute value thus obtained is less than the predetermined value ($\sigma'$) ("Yes" at step S402), the time server 101 sends the received local time ($T_N'$) and the authentic time ($T_N$) to the time-stamping device 1 (step S403), thereby ending the process. However, if the absolute value of the difference between the authentic time ($T_N$) and the received local time ($T_N'$) is equal to or greater than the predetermined value ($\sigma'$) ("No" at step S402), not only the time server 101 suspends sending the authentic time ($T_N$) to the time-stamping device 1 but instead sends an alert to the time-stamping device 1 (step S405), thereby ending the process.

Thus, the time server 101 does not provide the authentic time ($T_N$) to the time-stamping device 1 whose local time ($T_N'$) deviates in a major way from the authentic time ($T_N$). Consequently, the time-stamping device 1 can be effectively prevented from being used for fraudulent purposes.

Figure 10:
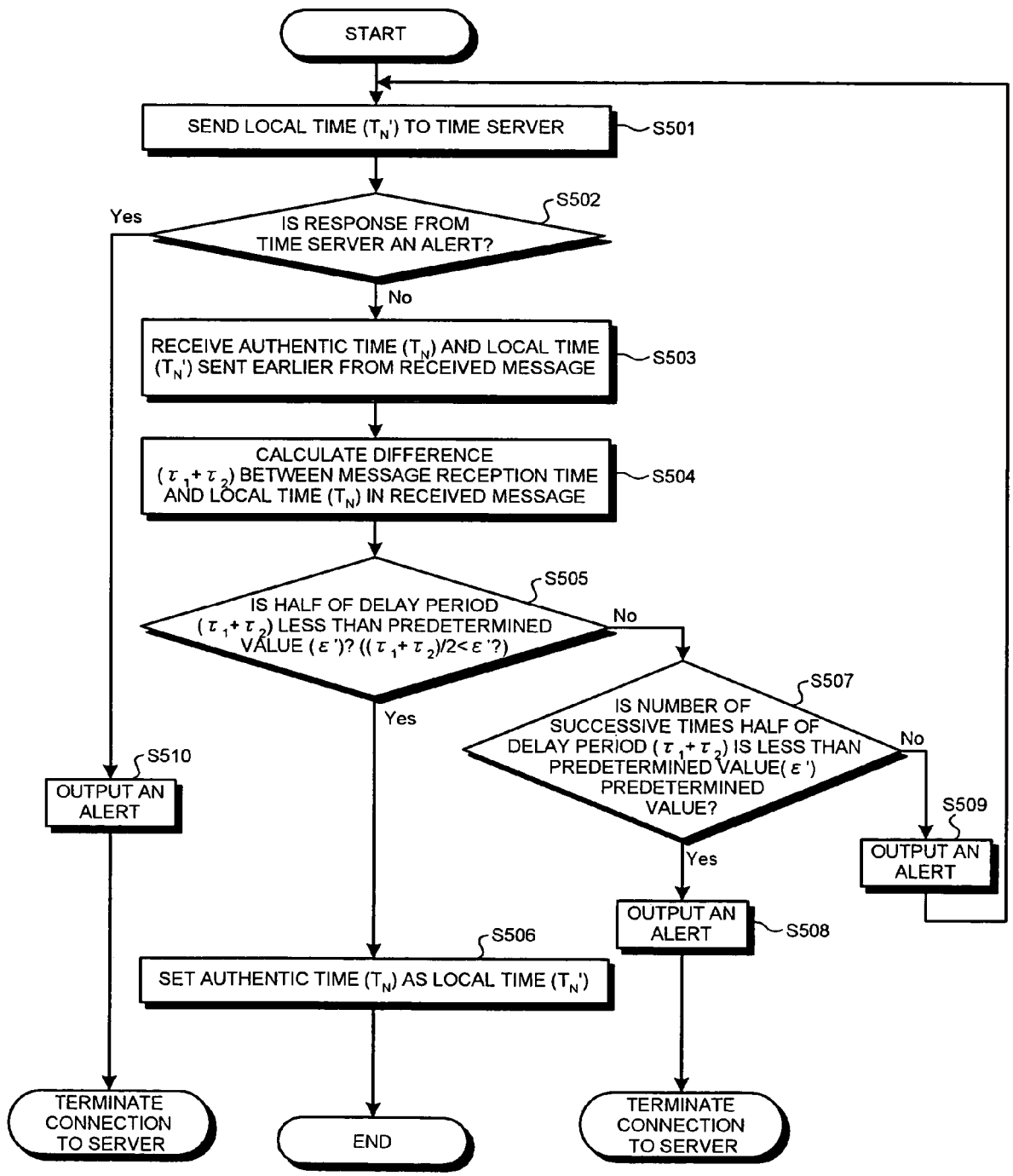
FIG. 10 is a flowchart of the delay compensation process performed by the time-stamping device.

FIG. 10 is a flowchart of the delay compensation process performed by the time-stamping device. As shown in FIG. 10, the time-stamping device 1 sends the local time ($T_N'$) to the time server 101 (step S501). If, in response, the time server 101 sends an alert ("Yes" at step S502), upon receiving the alert, the time-stamping device 1 outputs the alert on the display unit 5 (step S510) and terminates the connection with the time server 101.

If the message received from the time server 101 is not an alert ("No" at step S502), the time-stamping device 1 receives the authentic time ($T_N$) and the local time ($T_N'$) earlier sent to the time server 101 from the message (step S503). The time-stamping device 1 then calculates the difference ($\tau_1+\tau_2$) between the reception time of the message and the local time ($T_N'$) included in the message, the difference ($\tau_1+\tau_2$) being the delay period in sending the request to and receiving the response from the time server 101.

Next, the time-stamping device 1 determines whether the value obtained by halving the delay period ($\tau_1+\tau_2$) is less than a predetermined value ($\epsilon'$) (step S505). If the value obtained by halving the delay period ($\tau_1+\tau_2$) is found to be less than the predetermined value ($\epsilon'$) ("Yes" in step S505), the time-stamping device 1 sets the authentic time ($T_N$) as the new local time ($T_N'$) (step S506), thereby ending the process.

If the value obtained by halving the delay period ($\tau_1+\tau_2$) is found to be equal to or greater than the predetermined value ($\epsilon'$) ("No" in step S505), the time-stamping device 1 determines whether the number of successive times the value obtained by halving the delay period ($\tau_1+\tau_2$) is found to be equal to or greater than the predetermined value ($\epsilon'$) is of a predetermined value (step S507). If the number of successive times the value obtained by halving the delay period ($\tau_1+\tau_2$) is equal to or greater than the predetermined value ($\epsilon'$) is found to be of the predetermined value ("Yes" at step S507), the time-stamping device 1 outputs an alert (step S508) and terminates the connection with the time server 101. If the number of successive times the value obtained by halving the delay period ($\tau_1+\tau_2$) is equal to or greater than the predetermined value ($\epsilon'$) is found to be less than the predetermined value ("No" at step S507), the time-stamping device 1 outputs an alert on the display unit 5 (step S509) and repeats the steps from step S501 onward.

Thus, according to the present embodiment, a local time generated by a local time generating unit is modified according to a radio wave time received by a radio wave time receiving unit as well as corrected according to an authentic time received from a time server by an authentic time receiving unit. An authentic time requesting unit receives the authentic time when the difference between the local time and the radio wave time is less than a predetermined value as well as when the difference between the local time and the radio wave time is equal to or greater than the predetermined value exceeds a predetermined number of successive times. A time correction processor corrects the local time taking into consideration a delay period included in receiving the authentic time. Consequently, fraudulent falsification of the time can be prevented, thereby enhancing the reliability of the time included in a digital signature. Further, reliable time stamp can be guaranteed without having to be constantly connected to a network.

Figure 11:
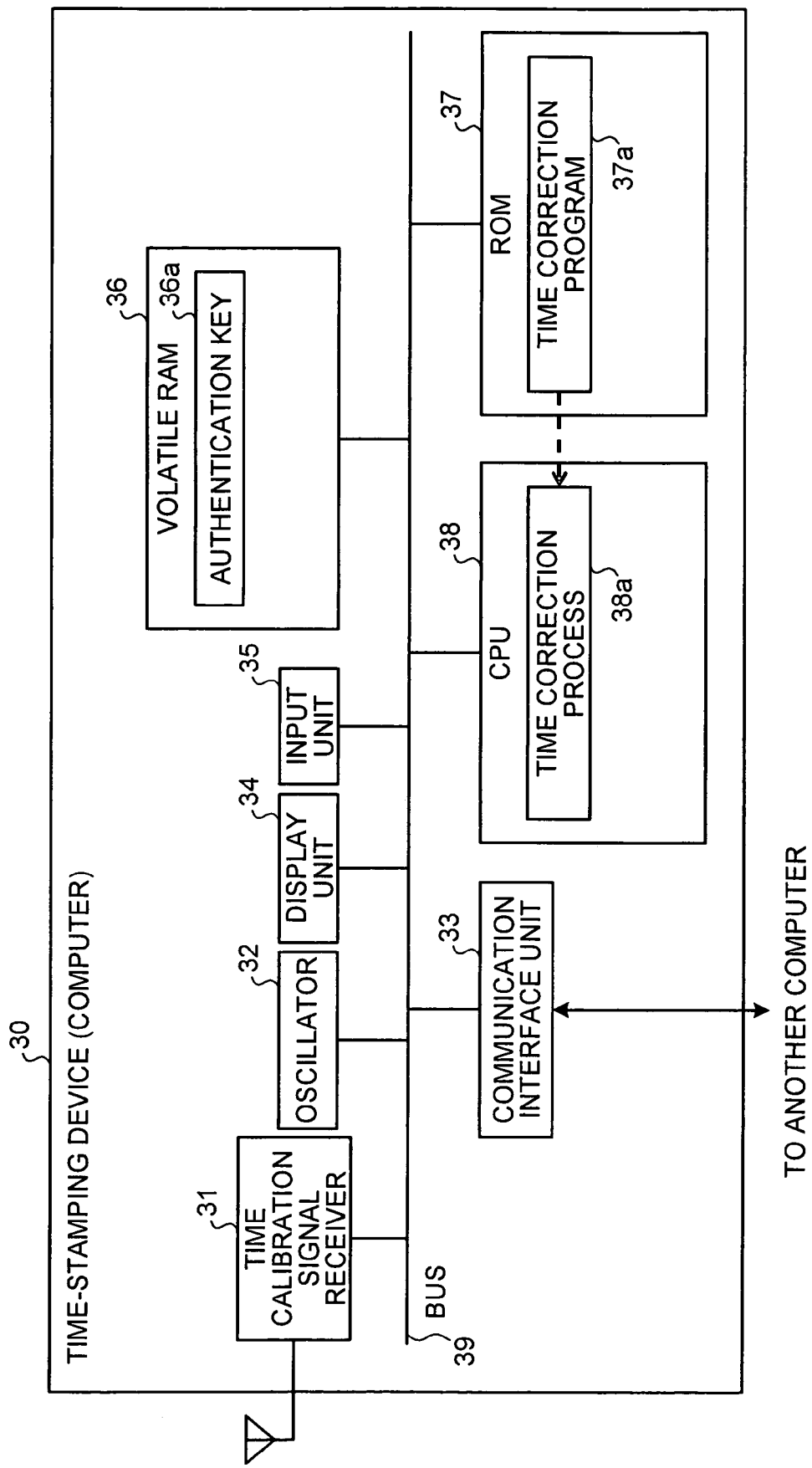
FIG. 11 is a schematic diagram of a computer that executes a time correction program.

The various processes explained in the present embodiment can be realized by a ready program installed in a computer. FIG. 11 is a schematic diagram of a computer that executes a time correction program with the functions explained in the above embodiment.

The word "computer" refers not only to personal computers, but also the so-called "built-in computer" built into devices such as digital cameras, digital video cameras, etc. The authenticity of data and time on electronic data such as text data, image data, video data, etc. can be guaranteed by enabling the execution of the time correction program on these computers.

As shown in FIG. 11, a computer 30 that functions as the time-stamping device includes a time calibration signal receiver 31, an oscillator 32, a communication interface unit 33, a display unit 34, an input unit 35, a volatile RAM 36, a read-only memory (ROM) 37, a central processing unit (CPU) 38, and a bus 39 that connects all the aforementioned parts. The time calibration signal receiver 31, the oscillator 32, the communication interface unit 33, the display unit 34, and the input unit 35 of FIG. 11 correspond respectively to the time calibration signal receiver 2, the oscillator 3, the communication interface unit 4, the display unit 5, and the input unit 6 shown in FIG. 4. The computer 30 is connected to another computer, the network, etc. via the communication interface unit 33.

The ROM 37 already has stored therein a time correction program 37*a*. The CPU 38 loads the time correction program 37*a* to execute it, causing the time correction program 37*a* to function as a time correction process 38*a*. The volatile RAM 36 stores an authentication key 36*a*, which is used when the time correction program 37*a* executes the time correction process.

The time correction program 37*a* need not necessarily be kept readily available in the ROM 37 but may be stored on a "portable physical medium" such as a flexible disk (FD), compact disk—read-only memory (CD-ROM), magneto optic disk (MO disk), or on "another computer (or server)" to which the computer 30 is connected via a public circuit, Internet, LAN, wide area network (WAN) etc., and the computer 30 may access and execute the program from these storage mediums.

According to the present invention, fraudulent falsification of the time can be prevented, thereby enhancing the reliability of the time included in a digital signature. Furthermore, the authenticity of the time can be guaranteed without having to be constantly connected to a network. Furthermore, by removing the effect of a delay caused in the network by tampering (in other words, by detecting the delay and preventing the authentic time that has been subjected to the effect of the delay from being adopted as the local time), the reliability of the local time can be ensured.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A time-stamping device that affixes a digital signature including a local time clocked by an internal clock to electronic data, the time-stamping device comprising:
   a radio-transmitted-time receiving unit that receives a standard time included in a radio wave as a radio-transmitted time;
   an authentic-time receiving unit that receives an authentic time synchronized with the standard time from a time server;
   a calculating unit that calculates an absolute value of a difference between the radio-transmitted time and the local time;
   a time modifying unit that modifies, when the absolute value calculated is less than a first threshold value, the local time by setting the radio-transmitted time as the local time, and leaves, when the absolute value calculated is equal to or greater than the first threshold value, the local time as it is; and
   a time correcting unit that corrects the local time based on the authentic time received;
   wherein the authentic-time receiving unit receives the authentic time from the time server when the absolute value calculated is less than the first threshold value a predetermined number of successive times.

2. A time-stamping device that affixes a digital signature including a local time clocked by an internal clock to electronic data, the time-stamping device comprising:
   a radio-transmitted-time receiving unit that receives a standard time included in a radio wave as a radio-transmitted time;
   an authentic-time receiving unit that receives an authentic time synchronized with the standard time from a time server;
   a calculating unit that calculates an absolute value of a difference between the radio-transmitted time and the local time;
   a time modifying unit that modifies, when the absolute value calculated is less than a first threshold value, the local time by setting the radio-transmitted time as the local time, and leaves, when the absolute value calculated is equal to or greater than the first threshold value, the local time as it is; and
   a time correcting unit that corrects the local time based on the authentic time received;
   wherein the authentic-time receiving unit receives the authentic time from the time server when the absolute value calculated is equal to or greater than the first threshold value a predetermined number of successive times.

3. A time-stamping device that affixes a digital signature including a local time clocked by an internal clock to electronic data, the time-stamping device comprising:
   a radio-transmitted-time receiving unit that receives a standard time included in a radio wave as a radio-transmitted time;
   an authentic-time receiving unit that receives an authentic time synchronized with the standard time from a time server;
   a calculating unit that calculates an absolute value of a difference between the radio-transmitted time and the local time;
   a time modifying unit that modifies, when the absolute value calculated is less than a first threshold value, the local time by setting the radio-transmitted time as the local time, and leaves, when the absolute value calculated is equal to or greater than the first threshold value, the local time as it is; and
   a time correcting unit that corrects the local time based on the authentic time received;
   wherein the authentic-time receiving unit receives the authentic time from the time server when a predetermined operation is carried out.

4. A time-stamping device that affixes a digital signature including a local time clocked by an internal clock to electronic data, the time-stamping device comprising:
   a radio-transmitted-time receiving unit that receives a standard time included in a radio wave as a radio-transmitted time;
   an authentic-time receiving unit that receives an authentic time synchronized with the standard time from a time server;
   a calculating unit that calculates an absolute value of a difference between the radio-transmitted time and the local time;
   a time modifying unit that modifies, when the absolute value calculated is less than a first threshold value, the local time by setting the radio-transmitted time as the local time, and leaves, when the absolute value calculated is equal to or greater than the first threshold value, the local time as it is; and
   a time correcting unit that corrects the local time based on the authentic time received;
   wherein the time correcting unit corrects the local time by setting the authentic time received as the local time when the absolute value is less than a second threshold value.

5. A time-stamping device that affixes a digital signature including a local time clocked by an internal clock to electronic data, the time-stamping device comprising:
   a radio-transmitted-time receiving unit that receives a standard time included in a radio wave as a radio-transmitted time;
   an authentic-time receiving unit that receives an authentic time synchronized with the standard time from a time server;
   a calculating unit that calculates an absolute value of a difference between the radio-transmitted time and the local time;
   a time modifying unit that modifies, when the absolute value calculated is less than a first threshold value, the local time by setting the radio-transmitted time as the local time, and leaves, when the absolute value calculated is equal to or greater than the first threshold value, the local time as it is; and
   a time correcting unit that corrects the local time based on the authentic time received;
   wherein the time correcting unit suspends affixing the digital signature to electronic data and outputs an alert when the absolute value is equal to or greater than a second threshold value a predetermined number of successive times.

6. A time-stamping device that affixes a digital signature including a local time clocked by an internal clock to electronic data, the time-stamping device comprising:

a radio-transmitted-time receiving unit that receives a standard time included in a radio wave as a radio-transmitted time;

an authentic-time receiving unit that receives an authentic time synchronized with the standard time from a time server;

a calculating unit that calculates an absolute value of a difference between the radio-transmitted time and the local time;

a time modifying unit that modifies, when the absolute value calculated is less than a first threshold value, the local time by setting the radio-transmitted time as the local time, and leaves, when the absolute value calculated is equal to or greater than the first threshold value, the local time as it is; and a time correcting unit that corrects the local time based on the authentic time received;

wherein the authentic-time receiving unit receives the authentic time when a value obtained by halving a delay period between making a request for the authentic time to the time server and receiving the authentic time from the time server is less than a second threshold value.

7. The time-stamping device according to claim 6, wherein the authentic-time receiving unit once again receives the authentic time from the time server when the value is equal to or greater than the second threshold value.

8. The time-stamping device according to claim 6, wherein the authentic-time receiving unit receives a plurality of authentic times from the time server and determines a mean of a plurality of delay periods.

9. The time-stamping device according to claim 6, wherein the authentic-time receiving unit receives a plurality of authentic times from a plurality of time servers and determines a mean of a plurality of delay periods.

10. The time-stamping device according to claim 6, wherein the authentic-time receiving unit requests the time server for the authentic time by sending the local time, and upon receiving a response that includes the local time as well as the authentic time from the time server, calculates the delay period by deducting the local time from a reception time of the response.

11. A time server for providing an authentic time for a time-stamping device that affixes a digital signature including a local time clocked by an internal clock to electronic data comprising:

a receiving unit that receives a local time signed with a digital signature of a client from the client;

a calculating unit that calculates an absolute value of a difference between the local time received and a reception time of the local time; and a sending unit that sends the local time received and the authentic time to the client when the absolute value calculated is less than a threshold value, wherein the authentic time is the reception time signed with a digital signature of the time server; and the sending unit sends an alert signed with the digital signature of the time server to the time-stamping device when the absolute value calculated is equal to or greater than the threshold value.

12. A method for correcting a difference between a local time clocked by an internal clock and a standard time, the method comprising:

receiving a standard time included in a radio wave as a radio-transmitted time;

receiving an authentic time synchronized with the standard time from a time server;

calculating an absolute value of a difference between the radio-transmitted time and the local time;

modifying the local time by setting the radio-transmitted time as the local time when the absolute value calculated is less than a threshold value; and correcting the local time based on the authentic time received;

wherein the receiving includes receiving the authentic time from the time server when the absolute value calculated is less than the threshold value a predetermined number of successive times.

13. A method for correcting a difference between a local time clocked by an internal clock and a standard time, the method comprising:

receiving a standard time included in a radio wave as a radio-transmitted time;

receiving an authentic time synchronized with the standard time from a time server;

calculating an absolute value of a difference between the radio-transmitted time and the local time;

modifying the local time by setting the radio-transmitted time as the local time when the absolute value calculated is less than a threshold value; and correcting the local time based on the authentic time received;

wherein the receiving includes receiving the authentic time from the time server when the absolute value calculated is equal to or greater than the threshold value a predetermined number of successive times.

14. A computer-readable recording medium that stores a computer program for correcting a difference between a local time clocked by an internal clock and a standard time, wherein the computer program causes a computer to execute:

receiving a standard time included in a radio wave as a radio-transmitted time;

receiving an authentic time synchronized with the standard time from a time server;

calculating an absolute value of a difference between the radio-transmitted time and the local time;

modifying the local time by setting the radio-transmitted time as the local time when the absolute value calculated is less than a threshold value; and correcting the local time based on the authentic time received;

wherein the receiving includes receiving the authentic time from the time server when the absolute value calculated is less than the threshold value a predetermined number of successive times.

15. A computer-readable recording medium that stores a computer program for correcting a difference between a local time clocked by an internal clock and a standard time, wherein the computer program causes a computer to execute:

receiving a standard time included in a radio wave as a radio-transmitted time;

receiving an authentic time synchronized with the standard time from a time server;

calculating an absolute value of a difference between the radio-transmitted time and the local time;

modifying the local time by setting the radio-transmitted time as the local time when the absolute value calculated is less than a threshold value; and correcting the local time based on the authentic time received;

wherein the receiving includes receiving the authentic time from the time server when the absolute value calculated is equal to or greater than the threshold value a predetermined number of successive times.

* * * * *